Sept. 2, 1958 J. L. MELSE ET AL 2,850,419
METHOD OF PASSIVATING SILVER
Filed May 14, 1956
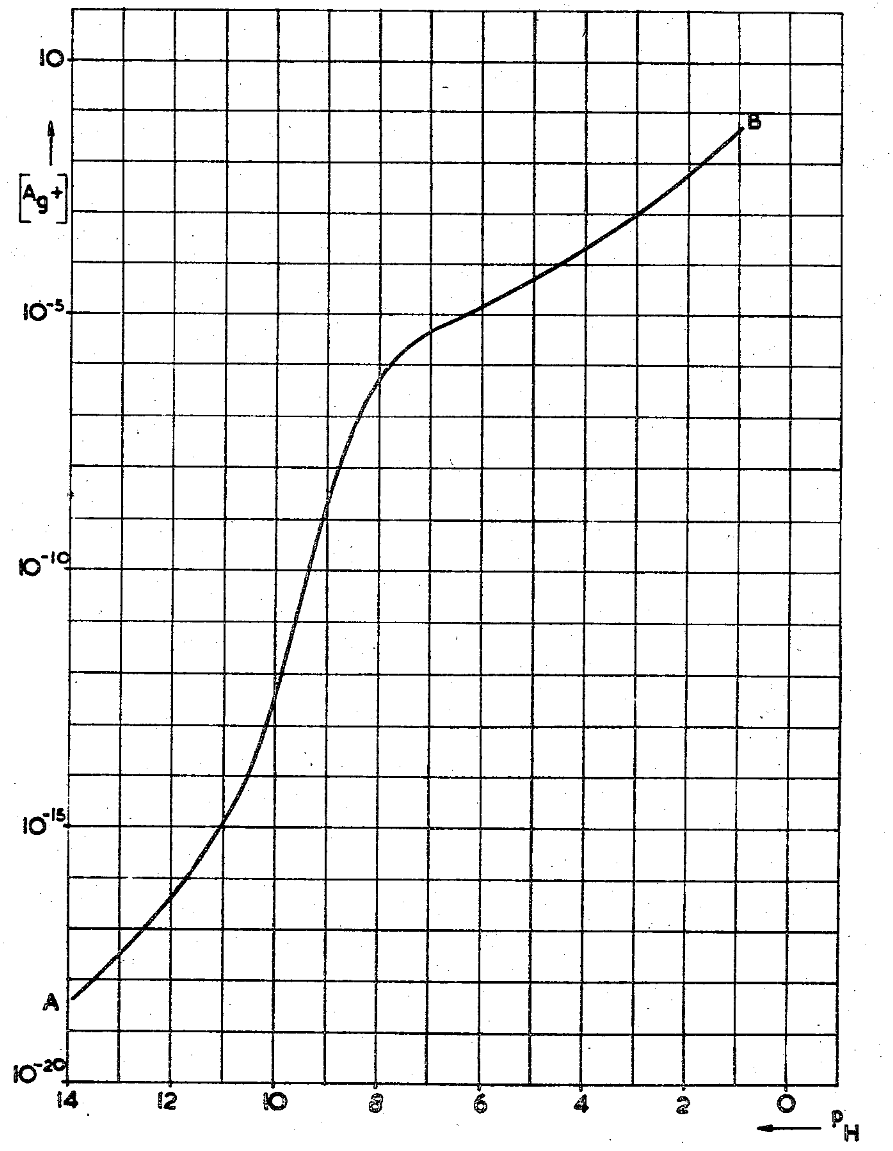
INVENTOR
JAN LEENDERT MELSE
PETRUS BAEYENS
BY [signature]
AGENT United States Patent Office 2,850,419

Patented Sept. 2, 1958

2,850,419

METHOD OF PASSIVATING SILVER

Jan Leendert Meise and Petrus Baeyens, Eindhoven, Netherlands, assignors, by mesne assignments, to North American Philips Company, Inc., New York, N. Y., a corporation of Delaware Application May 14, 1956, Serial No. 584,690

Claims priority, application Netherlands May 14, 1955

4 Claims. (Cl. 148—6.21)

This invention relates to a method of passivating silver, that is to say a treatment of a surface of silver or an alloy rich in silver, in order to prevent its being attacked by sulphur compounds, since the silver acquires an extremely thin layer insensitive to sulphur compounds.

It is known (U. S. patent specification 1,995,225) that silver can be passivated by causing a solution of an oxygen compound of 6-valent chromium to act on a silver surface, for which solutions of chromic acid and of potassium- and sodium bichromate are proposed, for example by immersing silver articles or silver-coated articles in such a solution for 3 to 6 minutes.

It has, however, been found that this method of passivation often causes discoloration of the silver and, if one succeeds in avoiding such discoloration, the passivation stability is usually low.

The present invention has for its object to improve this method and is characterised in that in the passivation liquid is dissolved a compound which, at the pH-value of this liquid, removes silver ions by forming silver complexes, the remaining silver ion concentration at this pH-value being described by a point at the right of the line AB in the accompanying graph.

The term "silver complexes" is here to be understood to mean a compound which is soluble in the passivation liquid and contains non-ionised silver.

As is known, such complexes are only stable in a pH-region characteristic for each silver complex. The silver-ion concentration of the passivation liquid can be determined by measuring the electro-motive force of a circuit between silver contacting this liquid, to which 0.001 g. ion of silver per litre in the form of silver nitrate has been added, and a calomel electrode which is connected through a tube filled with potassium-chloride agar-agar to the passivation liquid. Subsequently, the silver-ion concentration is calculated by means of the Nernst formula $$E=E_0-0.058 \log [Ag^+]$$

In this formula, E represents the measured electro-motive force, $E_0$ the standard potential of silver and $[Ag^+]$ the silver-ion concentration sought.

The silver-ion concentration of an aqueous silver salt solution in the presence of a compound capable of linking silver-ions to silver complexes can also be calculated from the well-known formula for the dissociation constant of the silver complex $$K=\frac{[Ag^+][Q^n]}{[AgQ^n]}$$

in which Q represents the concentration of the complex-forming material, $[AgQ^n]$ represents the concentration of the silver complex and $n$ the number of groups Q which, together with silver-ions, are assembled to form the complex compound $[AgQ^n]$.

The values of K and $n$ are known for a number of complex-forming materials, hence the silver-ion concentration of appropriately chosen concentrations can be calculated.

In the majority of cases it may be assumed that the presence of an oxygen compound of 6-valent chromium does not cause the result of the calculation to depart greatly from a measured value.

In view of the position of the line AB in the accompanying graph compounds yielding fairly strongly dissociated silver complex, may be employed particularly in the acid region. It is, however, to be noted that exactly in this acid region, that is to say the region lower than pH 6, most silver complexes are unstable, hence the use of a high pH-value of the passivation liquid is usually indicated, so that with suitable concentrations of the complex-forming compound such a pH-value is soon reached, at which the available silver-ion concentration no longer passivates the silver. According as the silver complexes are less dissociated, the choice of the pH-value of the passivation liquid is wider. Hence, cyanides will preferably be used as complex-forming compounds, which permits passivation in accordance with the invention in the pH-region between 7 and 13.5. If the high toxicity of cyanides is objectionable, for example for household use, ammonium compounds may be used, in which case the pH of the passivation liquid has however to be chosen between 6.1 and 10.1. Passivation of silver is effected by wetting the silver with the liquid in accordance with the invention, for example by spraying it with this liquid or by immersing the silver articles in it.

Wetting for 3 to 6 minutes at room-temperature is sufficient. At elevated temperatures this time may be shorter.

The concentration of the complex-forming materials and the oxygen compound of 6-valent chromium may be maintained low. This may, however, have a limitation in that the reaction products resulting from passivation rapidly exhaust the liquid. Therefore, the concentration of the chromium compound will usually not be made lower than 5 g. per litre and the concentration of the complex-forming material not lower than 1 g. per litre.

Presumably, passivation is the result of reduction of 6-valent chromium to 3-valent chromium at the silver surface followed by separation, at the silver surface, of a layer of a compound containing both hexavalent chromium and trivalent chromium, which separation is disturbed by an unsuitable electromotive force between the silver surface and the passivation liquid.

In order that the invention may be readily carried into effect the following examples are given:

*Example I*

To solutions all containing 0.1 g. mol. of potassium chromate per litre are added quantities of 2 g. per litre, 1 g. per litre and 1 g. per litre respectively of sodium-cyanide, these solutions subsequently being adjusted to pH-values of 10.8, 11.5, 12.0 and 13.5 respectively by dropwise adding potassium hydroxide. After adding to a part of each solution 0.001 g. ion silver per litre in the form of a silver nitrate solution, the silver-ion concentration is measured in the aforesaid manner. It was found to be $2\times10^{-20}$, $2.6\times10^{-22}$, approximately $1\times10^{-20}$ and $1.6\times10^{-19}$ g. ion per litre respectively.

In each solution, three silver strips 0.5 by 5 by 40 mms. were immersed for 5 minutes, the liquid constantly having a temperature of approximately 90° C. Subsequently, the silverstrips were rinsed in water. In order to judge the stability of passivation the strips were tested as follows:

(*a*) One strip was immersed for 2 minutes in a solution of sulphur liver, the concentration of which corresponded to 0.1 molar potassium sulphide;

(*b*) A second strip was stored in a closed receptacle over a saturated solution of potassium polysulphide for 48 hours.

(c) The third strip was suspended for 48 hours over a cesspit.

These treatments did not produce any visible discoloration or reduction of the lustre of the silver.

The test with the second strip was continued, but even after a fortnight no change was perceptible at this surface. For comparison it is pointed out that when using non-passivated silver for test (a), its surface turns yellow after a few seconds and turns intense brown after 2 minutes. When carrying out the test (b) with non-passivated silver, it turned brown after 48 hours, while that of the test (c) assumed a brownish black colour.

Also a solution containing 20 g. of potassium chromate per litre but no silver complex-forming compound invariably yielded intense coloured silver surfaces in carrying out said tests. With the use of an acid potassium bichromate solution (100 gms. per litre, pH 1.1) free from complex-forming materials as a passivation liquid, a faint discoloration occurred during passivation.

Heating said passivation liquid resulted in further discoloration. On subjecting passivated silver to the tests (a), (b) and (c) in this manner intenser colours resulted invariably.

For comparison, several silver pieces were passivated by means of a different known method (U. S. patent specification 2,117,657) by immersion in a solution containing 1 g. of $SnCl_2.2H_2O$ and 7 g. of hydrochloric acid (specific weight 1.18) per litre.

Investigation after the stability of the passivation by means of tests (a) and (b) revealed only a faint discoloration. When continuing the test (b), however, the silver pieces were found to be covered with a dull yellowish brown layer after a fortnight.

*Example II*

In a manner entirely corresponding to Example I, silver was passivated in a solution containing 20 g. of potassium chromate and 50 g. of sodium thiosulphate per litre, the pH-value, of the solution being made 8.3 and the temperature being 25° C. The silver-ion concentration found by measuring the electromotive force was $5.9\times10^{-14}$ g. ion per litre. On subjecting it to the test (a) no lustre or colour variations was perceptible.

For comparison it is pointed out that when increasing the pH of the solution to 11, with the result that the pH-value reaches a region in which the silver ion concentration is higher than is indicated by the line AB, the silver rapidly turns dark upon subjecting it to a hydrogen sulphide-containing vapour. The test piece behaves in exactly the same manner as when passivating it with a solution containing only chromate under otherwise the same test conditions.

*Example III*

Potassium chromate solutions of 20 g. per litre with a pH-value of 7.2, 8.5 and 9.5 respectively were given a potassium rhodanide content of 20 g. per litre. After immersion of silver for 2 minutes at 80° C. and upon subjecting it to the test (a) of Example I, the initial lustre and colour were unchanged. The silver-ion concentration in said liquids was $4.3\times10^{-11}$, $1.5\times10^{-11}$ and $1.0\times10^{-11}$ g. of Ag per litre. On raising the pH-value to 10.4 a silver-ion concentration of $1\times10^{-11}$ was measured, which however is insufficient for a satisfactory passivation. Hence, the test (a) of Example I resulted in a yellowish brown discoloration.

*Example IV*

Other complex-forming compounds yielding satisfactory results in a solution containing 20 g. of potassium chromate per litre are:

(1) $NH_4$ compounds, concentration—
100 ccs. of 26% $NH_4$ OH/1 pH ............ 6.9
50 ccs ............ 9.3
100 ccs ............ 9.0

(2) Piperidine, concentration—50 g. per litre pH 2.7.

(3) Sodium ethylene diamine tetra-acetic acid, concentration—50 g. per litre pH 3.0 (silver-ion concentration $1.2\times10^{-4}$ g. ion per litre).

(4) Potassium iodide, concentration—50 g. per litre pH 7.1.

For comparison, unstable passivation resulted in these solutions with:

(1) $NH_4$ compounds, concentration—100 cc. of 26% $NH_4$ OH/1 pH 11.0 and higher.

(2) Piperidine, 50 g. per litre pH 6.9 and higher.

(3) Potassium iodide, 50 g. per litre pH 9.0 and higher.

What is claimed is:

1. A method of passivating silver comprising the steps, contacting a silver article with an aqueous solution of an oxygen compound of hexavalent chromium in an amount greater than about 5 grams per liter and a water-soluble complex silver ion forming compound in an amount greater than about 1 gram per liter, and adjusting the relationship of the pH and free silver ion concentration of said solution while in contact with said silver article to a point to the right of the line AB in the accompanying graph.

2. A method of passivating silver comprising the steps, contacting a silver article with an aqueous solution of an oxygen compound of hexavalent chromium in an amount greater than about 5 grams per liter and a water-soluble complex silver ion forming compound selected from the group consisting of water-soluble cyanides, thiosulphates, iodides, ammonium compounds, piperidine, sodium ethylene diamine tetraacetic acid and potassium rhodanide in an amount greater than about 1 gram per liter, and adjusting the relationship of the pH and free silver ion concentration of said solution while in contact with said silver article to a point to the right of the line AB in the accompanying graph.

3. A method of passivating silver comprising the steps, contacting a silver article with an aqueous solution of an oxygen compound of hexavalent chromium in an amount greater than about 5 grams per liter and a soluble cyanide compound, in an amount greater than about 1 gram per liter adjusting the pH of said solution to a value between about 7 to 13.5, and adjusting the free silver ion concentration of said solution while in contact with said silver article to a point to the right of the line AB in the accompanying graph.

4. A method of passivating silver comprising the steps, contacting a silver article with an aqueous solution of an oxygen compound of hexavalent chromium in an amount greater than about 5 grams per liter and a soluble ammonium compound, in an amount greater than about 1 gram per liter adjusting the pH of said solution to a value between about 6.1 to 10.1, and adjusting the free silver ion concentration of said solution while in contact with said silver article to a point to the right of the line AB in the accompanying graph.

References Cited in the file of this patent

UNITED STATES PATENTS

| | | |
|---|---|---|
| 1,995,225 | Raub | Mar. 19, 1935 |
| 2,483,510 | Stareck | Oct. 4, 1949 |

FOREIGN PATENTS

| | | |
|---|---|---|
| 165,509 | Switzerland | Feb. 16, 1934 |